US011252792B2

(12) United States Patent
Seddik

(10) Patent No.: US 11,252,792 B2
(45) Date of Patent: Feb. 15, 2022

(54) DEVICE FOR SELECTIVE HEATING OF MATERIALS IN AN ELECTROMAGNETIC OVEN

(71) Applicant: SPOT LABS, LLC, Austin, TX (US)

(72) Inventor: Kareem Sameh Seddik, Austin, TX (US)

(73) Assignee: SPOT LABS, LLC, Austin, TX (US)

( * ) Notice: Subject to any disclaimer, the term of this patent is extended or adjusted under 35 U.S.C. 154(b) by 520 days.

(21) Appl. No.: 14/829,389

(22) Filed: Aug. 18, 2015

(65) Prior Publication Data

US 2016/0192446 A1 Jun. 30, 2016

Related U.S. Application Data

(60) Provisional application No. 62/013,954, filed on Jun. 18, 2014.

(51) Int. Cl.
*H05B 6/64* (2006.01)
*H05B 6/72* (2006.01)
(Continued)

(52) U.S. Cl.
CPC ........... *H05B 6/6447* (2013.01); *G05B 15/02* (2013.01); *G09B 19/0092* (2013.01);
(Continued)

(58) Field of Classification Search
CPC .......... H05B 6/00; H05B 6/64; H05B 6/6438; H05B 6/6447; H05B 6/66; H05B 6/68;
(Continued)

(56) References Cited

U.S. PATENT DOCUMENTS 4,868,358 A * 9/1989 Yamasaki ............... H05B 6/763
219/744
5,693,246 A * 12/1997 Han .................... H05B 6/6482
219/685
(Continued)

FOREIGN PATENT DOCUMENTS

CN 85101507 A 1/1987
CN 1143599 C 3/2004
(Continued)

OTHER PUBLICATIONS

International Search Report issued in PCT/US2015/045744 dated Nov. 13, 2015.
(Continued)

*Primary Examiner* — Ibrahime A Abraham
*Assistant Examiner* — Spencer H. Kirkwood
(74) *Attorney, Agent, or Firm* — DLA Piper LLP US

(57) ABSTRACT

A selective heating device may include a chamber, at least one heating element, and a circuit. The at least one heating element may selectively heat a first portion of a target in the chamber at a first energy level for a first period of time. The at least one heating element may also selectively heat a second portion of the target at a second energy level for a second period of time, wherein the second energy level and/or the second period of time are different from the first energy level and/or the first period of time; or refrain from heating a third portion of the target; or a combination thereof. The circuit may receive a heating instruction and control the at least one heating element based on the heating instruction.

16 Claims, 10 Drawing Sheets

(51) Int. Cl.
  *G05B 15/02* (2006.01)
  *G09B 19/00* (2006.01)
(52) U.S. Cl.
  CPC ........... *H05B 6/645* (2013.01); *H05B 6/6411* (2013.01); *H05B 6/6441* (2013.01); *H05B 6/6455* (2013.01); *H05B 6/6464* (2013.01); *H05B 6/6482* (2013.01); *H05B 6/72* (2013.01); *H05B 2206/044* (2013.01)
(58) Field of Classification Search
  CPC .. H05B 6/687; H05B 6/688; H05B 2206/044; Y02B 40/00; G09B 19/0092
  USPC .................. 219/678, 701, 702, 708, 705
  See application file for complete search history.

(56) References Cited

U.S. PATENT DOCUMENTS

| | | | |
|---|---|---|---|
| 5,693,264 | A | 12/1997 | Fricke |
| 6,359,270 | B1* | 3/2002 | Bridson ................. G10L 15/26 219/679 |
| 6,563,097 | B2* | 5/2003 | Taino ................... H05B 6/6402 219/711 |
| 8,492,686 | B2* | 7/2013 | Bilchinsky ............ H05B 6/688 219/678 |
| 2002/0059175 | A1* | 5/2002 | Nakano .................. G16H 20/60 340/6.1 |
| 2009/0236335 | A1* | 9/2009 | Ben-Shmuel ........ H05B 6/6402 219/710 |
| 2009/0321427 | A1* | 12/2009 | Hyde ...................... H05B 6/72 219/702 |
| 2013/0200065 | A1 | 8/2013 | Libman |

FOREIGN PATENT DOCUMENTS

| | | |
|---|---|---|
| CN | 102435619 A | 5/2012 |
| JP | 2009-259616 A | 11/2009 |
| WO | WO 2012-073113 A2 | 6/2012 |
| WO | WO 2012-109634 A1 | 8/2012 |

OTHER PUBLICATIONS

Written Opinion issued in PCT/US2015/045744 dated Nov. 13, 2015.
Chinese Office Action in CN Application No. 201580044031X dated Sep. 27, 2019.
Chinese Office Action in CN Application No. 201580044031X dated May 6, 2020.
Chinese Office Action in CN Application No. 201580044031.X, dated Dec. 3, 2020.

* cited by examiner

DEVICE FOR SELECTIVE HEATING OF MATERIALS IN AN ELECTROMAGNETIC OVEN

CROSS REFERENCE TO RELATED APPLICATION

This application is based on and derives the benefit of the filing date of U.S. Provisional Patent Application No. 62/013,954, filed Jun. 18, 2014, which is incorporated by reference in its entirety herein.

BACKGROUND

Currently, conventional electromagnetic ovens, such as microwave ovens, bombard food placed in a cavity with electromagnetic energy that causes food to heat through the process of dielectric heating. For example, conventional microwave ovens use a magnetron to emit electromagnetic waves in a cavity. This creates standing waves inside the cavity that heat all food items within the cavity. Conventional infrared ovens use high frequency radiation to heat foods inside a space. Similarly, these ovens heat all food items within the cavity.

In microwave ovens, the standing wave pattern forms areas of high and low energy concentrations, thus creating non-uniform heating of foods or materials inside the conventional microwave ovens. Conventional microwave ovens attempt to mitigate uneven distribution through the use of a variety of methods, such as motorized rotating dishes or microwave stirrers that randomize the standing waves patterns.

DETAILED DESCRIPTION OF SEVERAL EMBODIMENTS

Figure 1:
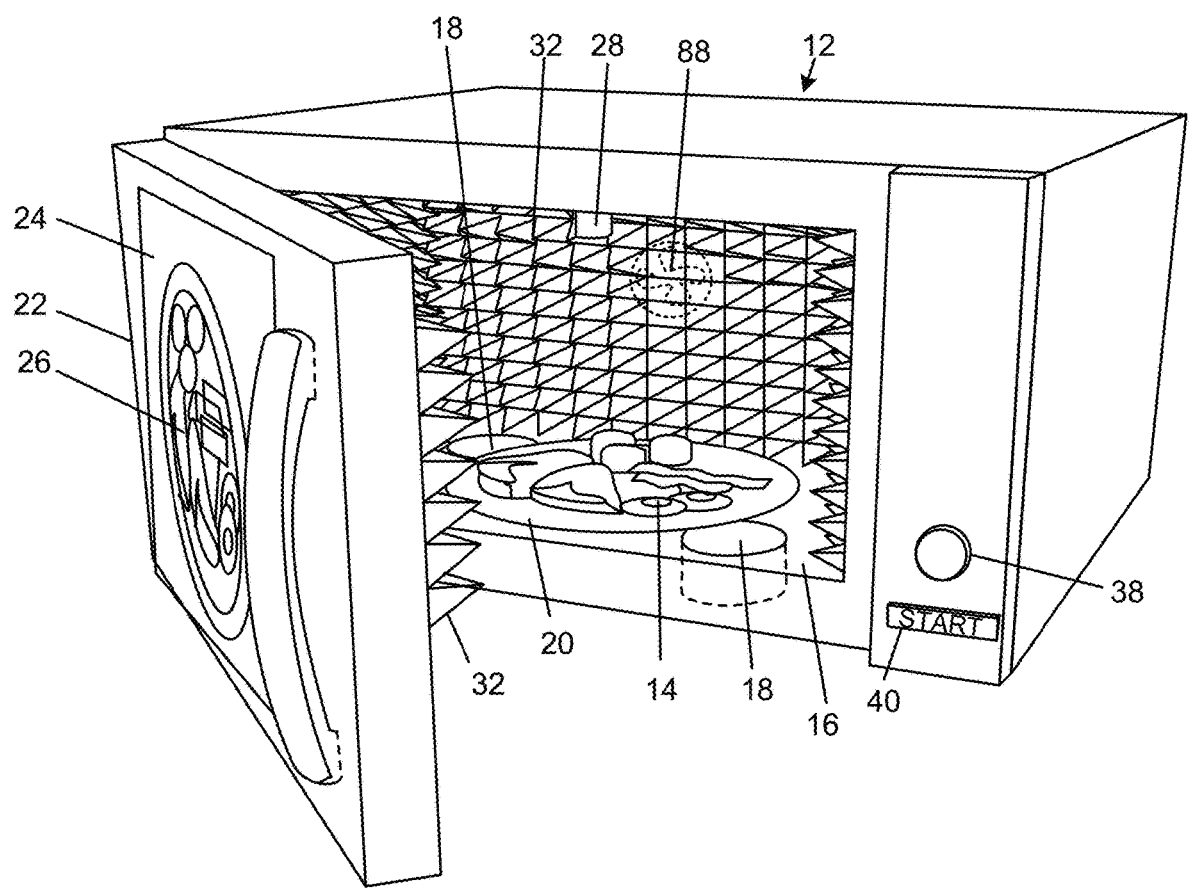
FIG. 1 is a perspective view of a selective heating electromagnetic oven according to an embodiment of the disclosed systems and methods.

Previously cooked foods, leftovers, and frozen meals may contain several different foods or dishes, often on the same plate or in the same container. A user may wish to heat all of the foods or may prefer to only heat some of the foods, while leaving other foods unheated. Additionally, a user may wish to heat some foods more than others.

For example, a user may have a salad and potatoes on the same dish. In this instance, the user may wish to only heat the potatoes, and not the salad. The methods and systems described herein may enable selecting and directing energy to only specific areas within the cavity of an oven, thus allowing a user to selectively heat specific areas of a food item(s). Not only may a user save time and be provided more convenience through increased functionality and control, a user may also choose to heat different food items within the cavity of an oven to different temperatures without having to segregate food items or have the oven run multiple heat cycles. In addition, methods and systems described herein may prevent or reduce non-uniform heating by controlling where the heat is applied to the selected food items.

Using the methods and systems described herein, a frozen food item may be transformed into an entire meal that emerges from an oven that may include a salad or fruit medley served cold on the same tray as a meat-loaf that is steaming hot. Using the methods and systems described herein, a user may be able to place a dish containing fries and ketchup into an oven and only heat the fries and while leaving the ketchup untouched. Using the methods and systems described herein, a chef may be able to prepare multiple meals simultaneously within a single oven space although each meal has different temperature and time requirements. In addition, instead of having to separate food into several containers or dishes and having to wait between each heating cycle, a user may be able to simultaneously place all the food on one container and selectively heat each item, thus reducing the amount of dishware and silverware needed, resulting in time, water, and energy savings.

The systems and methods described herein may perform selective heating of foods using electromagnetic energy. The term electromagnetic energy, as used herein, includes any or all portions of the electromagnetic spectrum, including, but not limited to, radio frequency (RF), infrared (IR), near infrared, visible light, ultraviolet, etc. In some cases, applied electromagnetic energy may include RF energy having wavelengths within a range of about 100 km to 1 mm, which corresponds to a frequency range of about 3 KHz to 300 GHz. In some cases, RF energy within a narrower frequency range, e.g., 1 MHz-100 GHz, may be applied. Applying energy in the RF portion of the electromagnetic spectrum is referred herein as applying RF energy. Microwave and ultra high frequency (UHF) energy, for example, are both within the RF range. In some other examples, the applied electromagnetic energy may fall only within one or more ISM frequency bands, for example, between 433.05 and 434.79 MHz, between 902 and 928 MHz, between 2400 and 2500 MHz, and/or between 5725 and 5875 MHz. Even though example embodiments are described herein in connection with the application of RF energy, these descriptions are provided as examples only, and are not intended to limit the scope of the described systems and methods to any particular portion of the electromagnetic spectrum.

In addition, the methods and systems described herein may include a machine readable code, or sticker, that could be attached to a food tray. The sticker may contain information about the locations and temperatures to be heated. A smart oven may automatically read the code and heat the food per the specified heat map. Thus, dinner food manufactures may have more advanced control over how their food is heated, users may have a fully one-button automatic heating solution.

Furthermore, the methods and systems described herein may go beyond the kitchen and food space to include other industrial and commercial applications such as materials manufacturing.

Disclosed herein are systems and methods for allowing a user to selectively heat different food items or different areas of a food item to different temperatures inside an electromagnetic oven without having to go through several iterations of removing and placing food inside the oven. An electromagnetic oven may be configured to allow a user to heat food items or different areas of a food item to different temperatures in one operation. The oven may include a user interface and camera mounted inside the oven cavity that allow a user to select food items or areas of food items to be heated on a touch-screen display. The oven may include a system that captures the user's selections and utilizes the captured data to control a heating system capable of directing electromagnetic energy to any area of the food. Selectively directing the energy to certain areas may allow the heating system to only heat the selected areas. In addition, the systems and methods described herein may include a method for allowing food manufacturers to create and store heat maps on a printable sticker or other label that can later be read by the oven and used to heat the food.

Moreover, since food items may be placed in a space with a camera, controlled lighting, controlled cavity geometry, and a user interface that allows users to select and identify foods, the system may be utilized to determine calories of the food items. The oven of the systems and methods described herein may have a camera, a controlled lighting condition, and a user interface that allows users to select an area of food. The oven may also have a weight scale to measure to total weight of the food items being placed. Using the area of the user's selection, the total weight of the plate, and an average estimate of food height, the volume of the food may be calculated. The oven may allow the user to enter the food type via the interface, and the oven may return the calorie count. This data can be obtained from a database stored within the oven's memory or from an online database through an internet capable oven. Alternatively, the food identification and calorie data may be stored on the ID sticker discussed herein. Or, the oven may use currently available image food recognition methods and improve their accuracy by providing a controlled food image capture with controlled lighting and image setup. The design of the oven cavity and electromagnetic emitters or applicators may be dependent on the frequency of operation used. Food can be heated through several frequency ranges in the electromagnetic spectrum, ranging from low radio frequency heating in the tens of KHz to the hundreds of GHz range, all the way to the higher end the frequency spectrum in the Infra-Red THz range, for example. Different frequency ranges may result in different food heating outcomes, with the lower frequencies penetrating the food more, and the higher frequencies causing more surface based heating. This is primarily due to the dielectric properties of foods at different temperatures and frequencies. In addition, cooking times and food taste may be altered based on the frequency of operation selected. For example, an oven operating in a very high frequency mode of operation in the infra-red range may only heat the surface of foods. The remaining volume of food is then heated through conduction of heat from the surface to the inner volume. Accordingly, high frequency cooking may produce more of a browning or crisping effect, but as heat conduction within foods is relatively slow, it may also result in increased heating time. This is similar to what happens in a convection based oven. On the other hand, an oven operating in the microwave frequency range may provide energy that is better able to penetrate foods. As such, the food volume may be heated much faster, but the crisping or browning effect is not produced. Thus, although a single frequency, or range of frequencies, may suffice to produce heating and a complete system, such as in the case of conventional microwave ovens, multiple methods or frequencies could be combined into a single system to produce various heating outcomes.

In one example embodiment, a number of RF electromagnetic applicators may be placed in specific stationary locations on the bottom floor of the oven. These applicators may create electromagnetic fields in their near vicinity and hence only heat food areas exposed to their near proximity. The applicators may be powered by a power source. The foods may be rotated on a plate, and the individual applicators' amplitudes may be increased (to heat) and decreased (not to heat) as the designated food areas to be heated move within proximity of the respective applicators. As such, different areas of the foods on the plate may be heated accordingly. The design and size of the applicators may define the heating area or "hot spot" of each applicator. The hot spot may also define the lowest heating resolution of the device. In addition, the physical size of the applicators may limit the number of hot spots the oven can have within the cavity space. As such, the food may be placed on stage that could be shifted in the X or Y axis directions in addition to being rotated to ensure full coverage of all areas of the plate to be heated.

To control which areas to heat, an input device such as an LCD touch screen, for example, may display a live image taken by a camera mounted inside the oven facing the food. The user may select which food items to heat by drawing circles or shapes around the food they desire to be heated on the LCD screen. Using software and an embedded microcontroller, the shapes or areas selected by the user may be converted into timing and control signals that control power to the electromagnetic applicators inside the oven.

In another example embodiment, a number of infrared heaters may be placed within the oven cavity. The infrared heaters may be configured to be highly directional and thus create a focused a beam of infrared energy on a specific hot spot. These infrared heaters may be placed on the ceiling of the oven pointing downwards at the food plates. An array of infrared heaters may be placed such that each heater targets a specific small area to be heated. The hot spot formed on the food by the heaters may be configured such that it forms the focal point of a spherical cap reflector. As such, any electromagnetic reflections off of the food will be reflected back towards the hot spot, preventing other unintended areas of the food to be heated. The infrared heaters may be powered by a power source. The foods may be rotated on a plate, and the individual infrared heaters may switched on (to heat) and off (not to heat) as the designated food areas to be heated move within proximity of the respective applicators. The food plate may also shift in the X and Y direction to ensure all areas of the plate to be heated are reachable. As such, different areas of the foods on the plate may be heated differently.

In another example embodiment, an antenna producing a highly directional focused beam of RF energy may be placed within the oven. The antenna may be a phased array antenna such that the focused beam produced may be steered in the desired direction to target a specific area of the food. The antenna may be mounted on the ceiling of the oven cavity such that the formed electromagnetic beam is aimed downwards at the food. In this example, the food may be stationary, as the RF beam direction may be controlled to reach all areas of the food. The cavity of the oven may also include a system of absorbers and reflectors to insure that any electromagnetic energy reflected off the food or other items in the oven does not get transmitted to other unintended areas of the food. In addition, the absorbers may be configured to absorb any electromagnetic energy produced by side lobe energy fields produced by the antennas (i.e., energy that is not part of the focused beam).

FIG. 1 is a perspective view of a selective heating electromagnetic oven or other heating system according to an embodiment of the disclosed systems and methods. The heating system 12 may be configured for enabling a user to selectively heat food items 14, or other materials, within a microwave oven cavity 16. The system 12 may include stationary open ended RF applicators 18 that are placed underneath a rotating plate 20, or any other high power low frequency electromagnetic applicators capable of generating fields that couple with materials only in close proximity to each applicator. The RF applicators may heat the food when fringing fields interact with the food, thereby producing heat. The user may interact with the system 12 through an interface 22. Interface 22 may include an LCD touch screen 24 that displays an image 26 of the food items 14 inside the cavity 16 of the system 12, for example. The image 26 of the food items 14 that are inside the cavity 16 of the system 12 may be captured using a camera 28 located inside the system 12 or other device that may be used to measure and display to the user a graphical representation of the materials inside the system 12. The food may be placed on a rotating platter 20. As the platter rotates, the food items 14 may pass over the RF applicators 18. To control which areas of the food 14 are heated, the RF applicators 18 may be switched on or off as the designated food items to be heated pass within each respective RF applicator 18 electromagnetic field. An embedded microcontroller (not shown) may capture the user's area selection 42 from the interface 22. The controller may convert the user's heat drawing and time selections into a series of on/off sequences to the power sources (not shown) powering each individual RF applicator 18. The timing sequence of on/off commands may correspond to the time at which a designed area to be heated moves within a respective RF applicator's electromagnetic field. For example, FIG. 4 (described below) explains how this control may be accomplished in some embodiments Conventional microwave ovens use the reflective inner walls of an oven cavity to create standing wave patterns at the cavity's resonant frequency. This is accomplished through specific tuning of the design and dimensions of the cavity. However, standing wave patterns may result in energy bouncing off the walls and striking areas of the food 14 that the user does not desire to be heated. As such, the cavity 16 may be lined with microwave absorbent materials 32 that create an anechoic chamber. When the RF applicators 18 generate electromagnetic radiation energy, most of it may be coupled with a particular area of the food item 14, causing it to heat, yet some radiation energy may escape into the cavity. As such, the wall lining and design of the interior cavity 16 may prevent the reflection of radiation energy off of the inside walls of the cavity 16. The radiation energy may be prevented from bouncing back and heating other unintended areas of the food items 14 inside the cavity 16 by the high absorbency of the microwave absorbent materials 32 on the inner walls. Additionally, this feature may simplify the design of the oven cavity. The cavity's size need not conform to specific dimensions that achieve resonance at specific frequencies. Instead, the oven cavity may be designed to any shapes or dimensions. In order to further reduce and/or prevent inadvertent or incorrect heating of areas of the food 14 that are not to be heated, an exhaust fan 88 may be included to draw hot air from inside the cavity 16 to the outside of the cavity 16. Air in the cavity 16 may be heated through contact with the heated food 14 and, unless removed from the cavity 16, may heat colder areas of the food 14 through convection. Thus, the fan 88 may operate continuously during a heating operation, or after ambient temperature in the cavity 16 reaches some predetermined level, to draw hot air away from the food 14.

Figure 3:
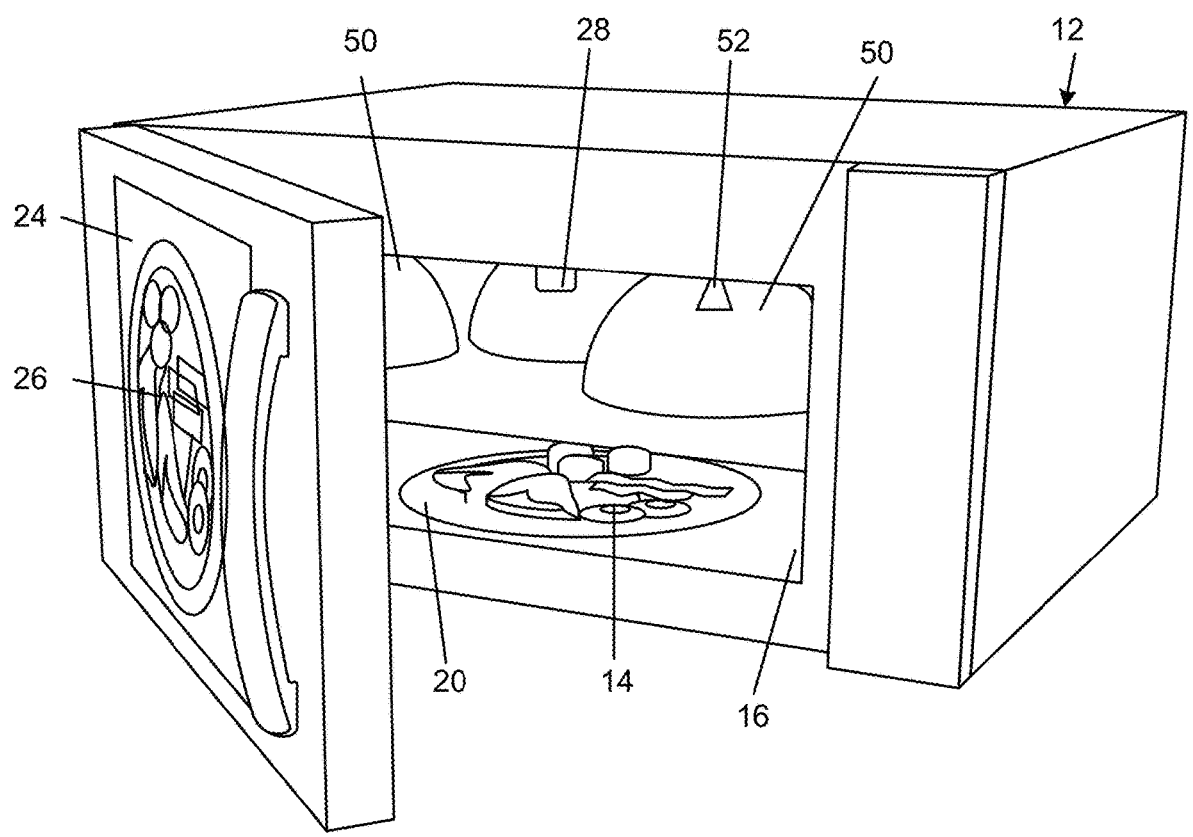
FIG. 3 is a perspective view of a selective infra-red heating based oven according to an embodiment of the disclosed systems and methods.

FIG. 3 is a perspective view of a selective infra-red heating based oven according to an embodiment of the disclosed systems and methods. This embodiment offers similar selective heating functionalities to other embodiments, however the heating is accomplished via infrared heating. This is a very high frequency method of heating that may result in more of a surface type heating of the food. This embodiment may include stationary highly directional beam infrared emitters 52 that are mounted on the ceiling of the oven cavity 16. The infrared heaters may emit a narrow beam that only heats a small area directly below the emitter. This area is called the hot spot. For example, the hot spot could be an inch in diameter or some other dimension. The hot spot size may determine the smallest heating area resolution. In addition, the infrared source may be one that has a fast heating response time, as described later. An infra-red spherical cap reflector 50 may be mounted on the ceiling. The spherical cap reflector 50 may be positioned such that the center of the imaginary sphere created by the cap may be where the hot spot is centered. In other words, the focal point of the reflector 50 may be where the infrared hot spot is created on the food below the infra-red emitter 52. The spherical cap reflector 50 may be used to capture a portion of the electromagnetic energy that inadvertently reflects off the plate or shiny surfaces of food and reflect it back onto the hot spot. Otherwise, the energy would reflect back out into the cavity and dissipate into unintended food areas. Thus, the reflector 50 may improve the efficiency of the oven and the accuracy of the selective heating process. The user may interact with the system 12 through an interface 22 that may include an interface such as an LCD touch screen 24 that may display an image 26 of the food items 14 inside the cavity 16 of the system 12. The image 26 of the food items 14 that are inside the cavity 16 of the system 12 may be captured using a camera 28 located inside the system 12 or other device that may be used to measure and display to the user a graphical representation of the materials inside the system 12. The camera may be placed inside an electromagnetic shield structure to protect its circuitry from the electromagnetic radiation. The food may be placed on a rotating platter 20. As the platter rotates, the food items 14 may pass below the infra-red emitters 52. To control which areas of the food 14 are heated, the infrared emitters 52 may be switched on or off as the designated food items to be heated pass below the hot spot. The infra-red emitters 52 may have a fast turn on time or low time to heat. This may reduce the overall heating time of the dish. An embedded microcontroller (not shown) may capture the user's area selection 42 from the interface 22. The controller may convert the user's heat drawing and time selections into a series of on/off control signals to the power sources (not shown) powering each individual infrared emitter 52. The timing sequence of on/off commands may correspond to the time at which a designed area to be heated moves within an infrared emitter's hot spot, as discussed below with respect to FIG. 4, for example. Although it is not shown in FIG. 3, the embodiment of FIG. 3 may include a fan to draw hot air away from the food 14, like fan 88 in the embodiment of FIG. 1.

Figure 9:
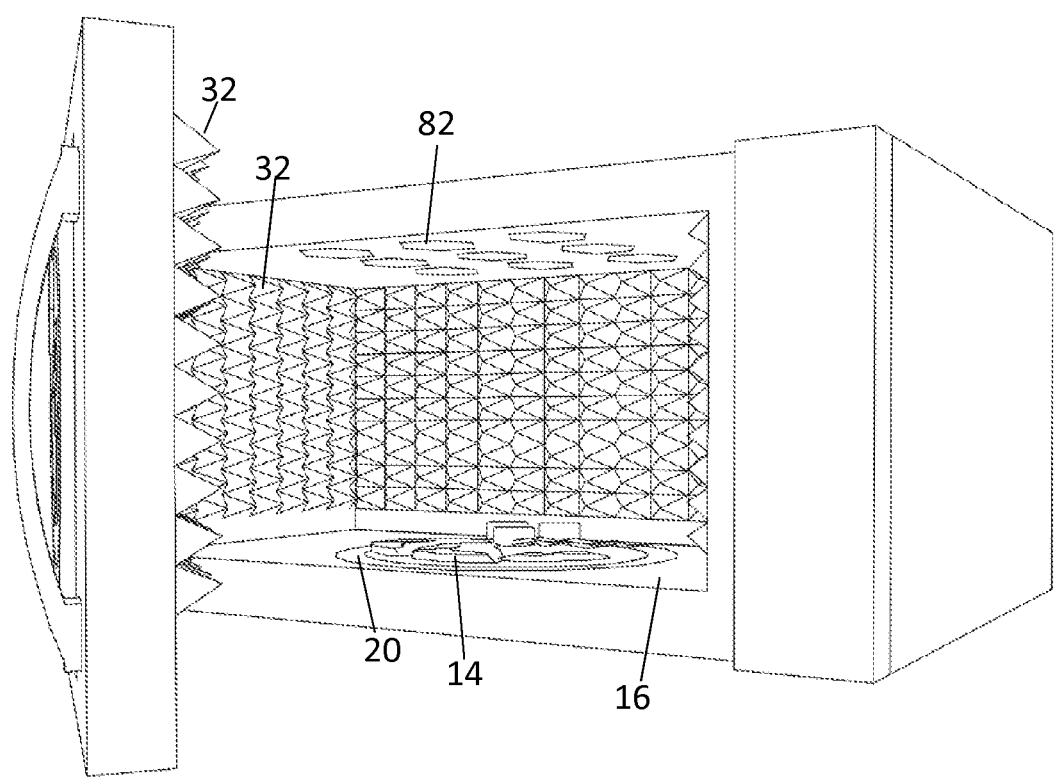
FIG. 9 is a perspective view of a selective heating phase array-antenna microwave oven according to an embodiment of the disclosed systems and methods.

FIG. 9 is a perspective view of a selective phase array antenna microwave oven according to an embodiment of the disclosed systems and methods. The oven of FIG. 9 is similar to the oven of FIG. 1 described above, and certain details (e.g., camera 28, display 24, controls 38, 40, etc.) are omitted in the drawing, but may be present in the oven. For example, this embodiment may include a fan to draw hot air away from the food 14, like the embodiment of FIG. 1. Also, instead of using the heating elements 18 of FIG. 1, the embodiment of FIG. 9 may include one or more phase array antennas 82. The phase array 82 may provide two or more focused beams that may be steered in the desired direction to target a specific area of the food 14. The antenna may be mounted on the ceiling of the oven cavity such that the formed electromagnetic beam is aimed downwards at the food, as shown. There may be many possible locations to position the antenna. For example, the antenna may be placed on the top wall, the sidewalls, or placed as an array of antennas in multiple locations within the cooking cavity 16. In this example, the food may be stationary, as the RF beam direction may be controlled to reach all areas of the food. The antenna may produce a narrow beam of electromagnetic radiation creating a focused hot spot on the food items. Thus, unlike in FIG. 1, this embodiment may omit the rotating platter 20. The cavity of the oven may also include a microwave absorbent materials 32 to insure that any electromagnetic energy reflected off the food or other items in the oven does not get transmitted to other unintended areas of the food. Another example may include several phase array antennas or other types of antennas able to direct and heat multiple spots simultaneously or non-simultaneously. For example, while an array 82 is shown in this example, an electromagnetic energy-emitting device may be configured to include an antenna, magnetron, waveguide, etc. or any other electromagnetic radiation producing or electromagnetic wave guiding device or combination of devices that may produce a directed radiation pattern. This focused energy-emitting device may be located inside the cavity 16 of the system and may direct radiation energy to a particular food item 14 or area within the cavity.

Figure 4:
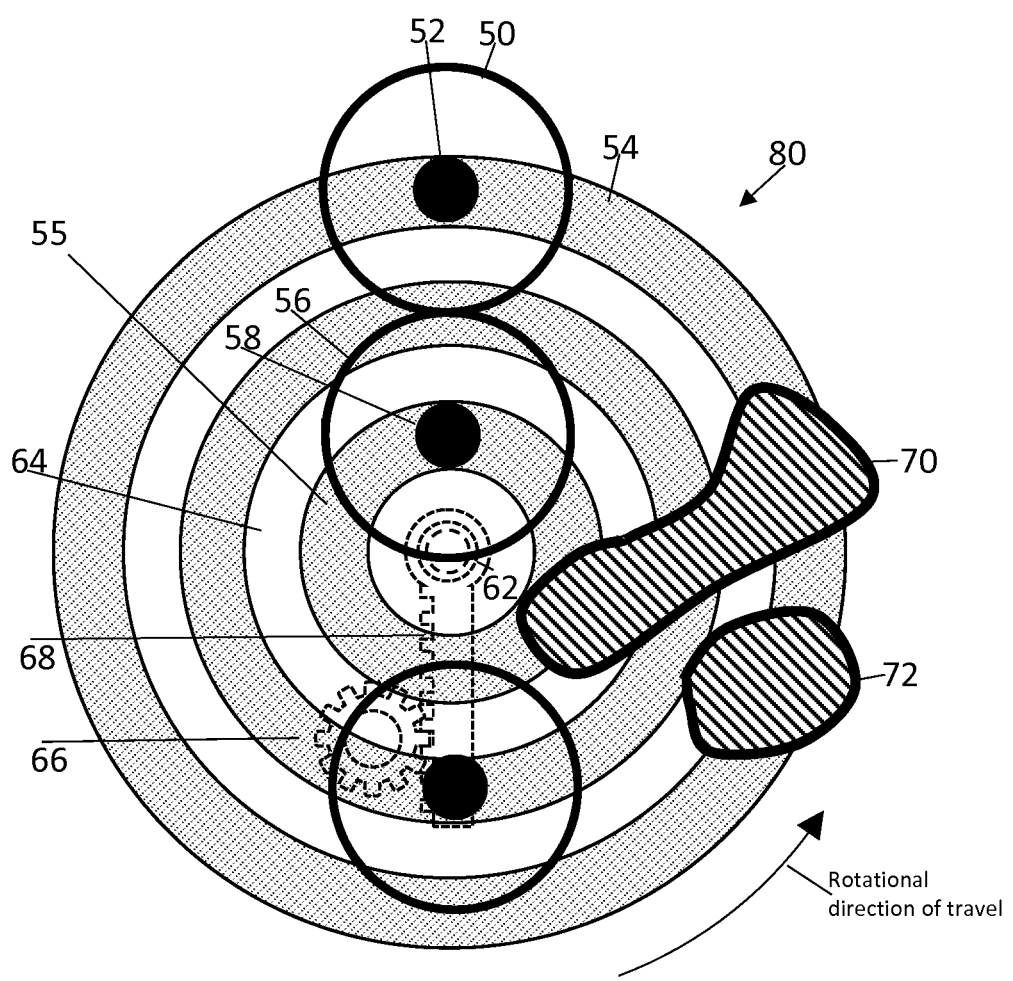
FIG. 4 is a top down view of the inside of an oven cavity oven according to an embodiment of the disclosed systems and methods.

FIG. 4 is a top down view of the inside of an oven cavity oven according to an embodiment of the disclosed systems and methods. The figure illustrates an example of how the heating devices 50 and 56 may be positioned inside the cavity in such an arrangement as to be able to reach all areas of the food dish. One constraint in the design of the heating device is the physical size and shape of the device. For some device sizes and/or shapes, it may not be possible to place enough stationary heating devices within a standard consumer appliance size cavity to target all possible areas of the dish. The heating devices, which may be any type, may occupy some space 50 and 56 but produce a hot spot of size 52 and 58. The plate (not shown) has food items 70 and 72. A servo or stepper motor 62 may be provided at the center of the device to rotate the plate. Hot spot 52 can reach, and therefore heat, areas of the plate depicted by the circular track 54. Similarly, hot spot 58 can reach, and therefore heat, areas of the plate depicted by the circular track 55. However, as intentionally shown in this example, track 64 cannot be reached by any hot spots. This could be the case when the heating devices are too large to fit close to each other or as a design choice to restrict the total number of heating devices. To resolve this, the plate may be placed on a Y-stage, which may shift the plate by one track width in the Y direction. This may be accomplished using another servomotor 66 connected to the center pivot of the servomotor 62 via a geared rod 68. By controlling the rotation of servomotor 66, the entire food plate will shift in the +−Y direction (up/down in the figure) For example, if the plate shifts by one track width in the downward, −Y, direction, track 64 can now be heated by hotspot 58. Using this method, all areas of the plate can be reached by at least one of the heaters. In some embodiments, second servomotors 66 may be connected to one or more of the heating devices instead of the servomotor 62. In this case, the heating devices themselves may be shifted, rather than the plate. So, as the plate rotates in the counter clockwise direction, the food items 70 and 72 will approach the hotspots 52 and 58. Assuming food item 70 is the item the user wants to heat, and food item 72 is the one the user does not want to heat, then as food item 70 passes over a hot spot 52 or 58, heating devices 50 and 56 will turn on. Similarly, the heating devices 50 and 56 will switch off when food item 72 passes above them.

Figure 2:
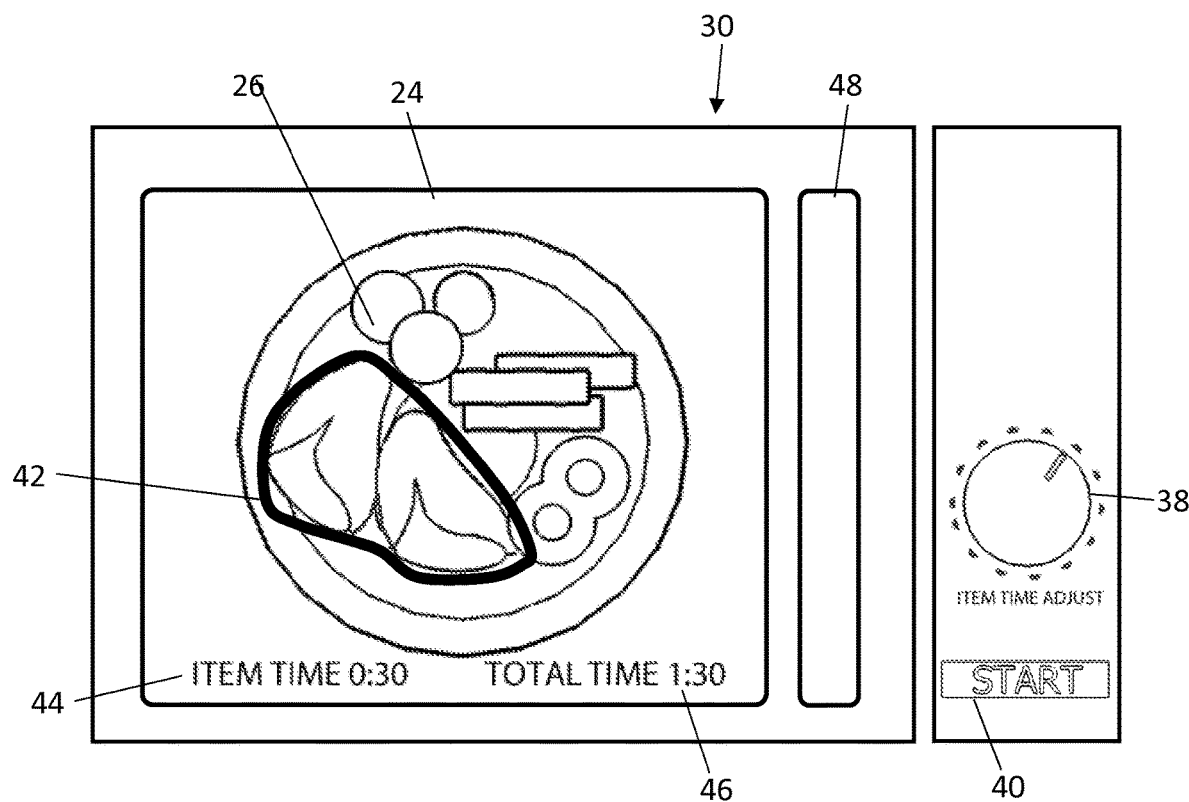
FIG. 2 is a front view of a selective heating oven control panel according to an embodiment of the disclosed systems and methods.

As discussed with respect to FIG. 2 below, some embodiments may allow a user to select the items they desire to heat by drawing an outline around the food item or area within the oven. A microcontroller then may close the loop created by the outline and fill in the entire shape. The resulting shape may be made of cells or pixels that represent the finest resolution for heat control. Each pixel may have a polar coordinate made up of an angle and a distance from the center, or a radius. Each hotspot may have fixed polar coordinates. As the motor 62 rotates the dish, the shape's angle may be updated, but the distance parameter may be fixed. At every step in the rotation for which the angle is updated, the processor may compare the new coordinates of the shape's pixels with those of the hot spots. If a pixel coordinate matches that of the hotspot, that hotspot may be turned on until no more pixel coordinates match the hotspot's coordinates. For example, for the sake of simplicity of the discussion, assume the pixel size is very large. In this case, as large as food item 72. If the user highlights item 72, the assigned heating pixel will be Angle 300 degrees, Radius 10 cm. The angle is measured from the 3 o'clock position going counterclockwise in FIG. 4. Thus, heater 52 is at a coordinate of Angle 30 and Radius 10 cm. As the plate rotates, the angle of food item 72 slowly approaches angle 0 as it approaches the 3'oclock position, then starts increasing as it passes the 3'oclock position. After some time, the food item 72 will be at Angle 30 and Radius 10 which is the coordinate of the heater. Thus, the processor may turn on the heater and, using a similar logic, turn off the heater when the food item passes. The processor may know the angle of the plate as it may be repeatedly communicated by the servo motor 62 and/or a servo motor 62 controller (not shown). The following algorithm represents a simplified method for controlling the heaters. However, in some embodiments further optimization may be done, such as controlling rotation speed and direction, compensating for heater turn on/off times, and/or adjusting the shape's dimensions to adjust for shape edges.

The heating region may be small enough to allow for the heating of specific areas of food items, but not so small as to require considerable additional time to heat the entire food item. The frequency, intensity, and amplitude of the electromagnetic radiation energy may be configured in a manner that is most optimal for the cavity design to produce a desired directed pattern and also within a range to produce dielectric heating of food items 14.

There may be various methods and techniques to control where the energy is to be directed. For example, some embodiments of the system 12 may include a phase array antenna 82 that may steer the radiation beam to heat any area of the food items. Such a design may not require a moving platter, as the actual direction of the beam is altered and thus able to heat any area of the food item.

In some embodiments, the microwave source may be configured to maintain a constant radiation pattern, and the antenna 82 may be mounted upon an actuated mechanical platform that directs the antenna 82 in a desired direction.

Some embodiments may utilize a combination of the above methods to allow a user to direct radiation energy to only the food items or areas of a food item selected for heating.

Some embodiments of the system may allow a user to select which food items or areas of a food item will be heated, as well as what heat intensity to apply to the food item or area of a food item. FIG. 2 illustrates a front view of an example of a selective heating oven control panel 30 that may be located on the system and accessible by a user. The user may use handle 48 to open the door and place the food items in the cavity. The front panel 30 may include a touch screen display 24, a knob 38 for adjusting the heating time or temperature, and a start button 40. The touch screen display 24 may display an image 26 of a food item 14 and any other contents contained inside the cavity 16 of the system 12 and captured by the camera 28.

A user may select the area to be heated by highlighting that area with their finger on the touch screen display 24. The highlighted area, called the selected area 42, corresponds to a physical area inside the cavity 16. A user may use the knob 38 to adjust the amount of time 44 that a user desires for the selected area 42 to be heated.

A user may repeat this process for other food items 14 or areas of a food item 14. Thus, different areas of a food item 14 can be heated for different periods of time, or temperatures, based on the desired selection of a user. The touch screen display 24 may display to a user the selected area time 44 and the total time 48 for all the food items 14 to be heated completely, based on the desired selection entered by a user. A user may then press the start button 40 in order to direct the system to begin heating the food items based on the user-specified configurations.

The system may be configured to utilize a variety of methods to enable a user to select food items 14 or areas of a food item 14 that are displayed on the image 26 of the touch screen display 24. In one example embodiment, a user may select the area within the cavity of the system that is to be heated by the user coloring in or highlighting a food item or area of a food item displayed on a screen of a user interface by the user pressing a finger or a pointing device to trace a desired heating area. The amount of heat applied by the system to the various areas may also be determined by the intensity of coloring applied by a user.

For example, a user may shade in a region by pressing their finger or a pointing device on a screen on the user interface that displays an image of the food items and other contents contained within the cavity of the system. A food item that is viewed on the screen of the user interface, for example, may transform from light red to dark red to indicate that a food item or area of a food item has been selected, and/or also to display the intensity that a user selected for a food item or area of a food item that a user desires to be heated and selects through the user interface.

The darker the color the more radiation exposure time or radiation energy is applied to that area and thus more heat is to be generated at that area.

In another example embodiment, a user may draw a closed loop on a screen on a user interface using their finger to trace around a food item 14 displayed on the screen, in order for the user to indicate which food item(s) or areas of a food item to be heated. Once a user traces a closed figure around a food item(s) or area of a food item, the system 12 may identify the closed figure as an area to be heated and may display the registration of this selection on the screen, possibly by shading the enclosed area selected with another color, to the user. A user may then adjust the knob 38 to input a desired amount of time to heat the selected area. A user may draw as many areas as the user desires.

A user may select previously drawn areas by tapping on the area identifying the particular drawn area with their finger or pointing device in order to adjust the time settings for the particular drawn area or to otherwise modify or delete the drawn area before the user directs the system to begin heating process. Once a user has selected the drawn areas, and selected the respective heating time and intensity settings, the user may press the start button 40 to begin the heating process. Data for the colored area and intensity may be captured by a processor unit inside the system 12 which may convert coordinates of the drawn region into data for directing the heating processes available to the system, as described herein.

Figure 6:
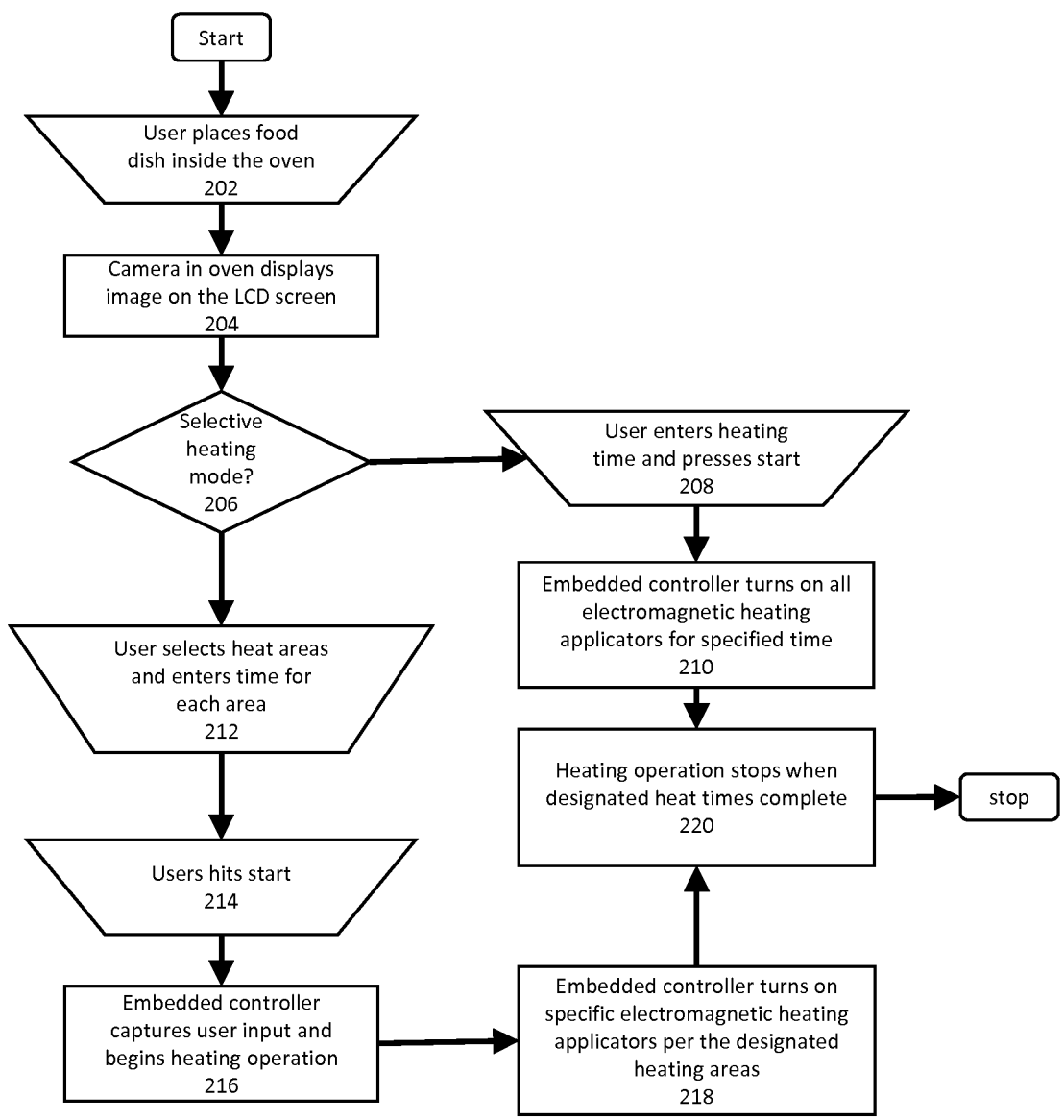
FIG. 6 is a selective heating process according to an embodiment of the disclosed systems and methods.

Generally, operation of the system 12 may proceed as shown in FIG. 6. A user may place food inside the oven 202, and the image of the food taken by the camera may be displayed on the display screen 204. The user may choose to heat the entire plate or may choose selective heating mode 206. If the entire plate is to be heated, the user may enter a heating time, power, and/or other settings and press start 208. The system 12 controller may turn on all heating elements for the specified time 210. When the time is elapsed, the heating operation may end 220. If the user chooses selective heating mode 206, the user may select heat areas and, in some cases, specify time and/or power for each area 212. The user may start the heating cycle 214. The controller may receive the user input and start the heating operation 216. The controller may turn on specific heating elements at specific times as required by the user input heating areas 218. When all areas are heated as desired, the heating operation may end 220.

Figure 7:
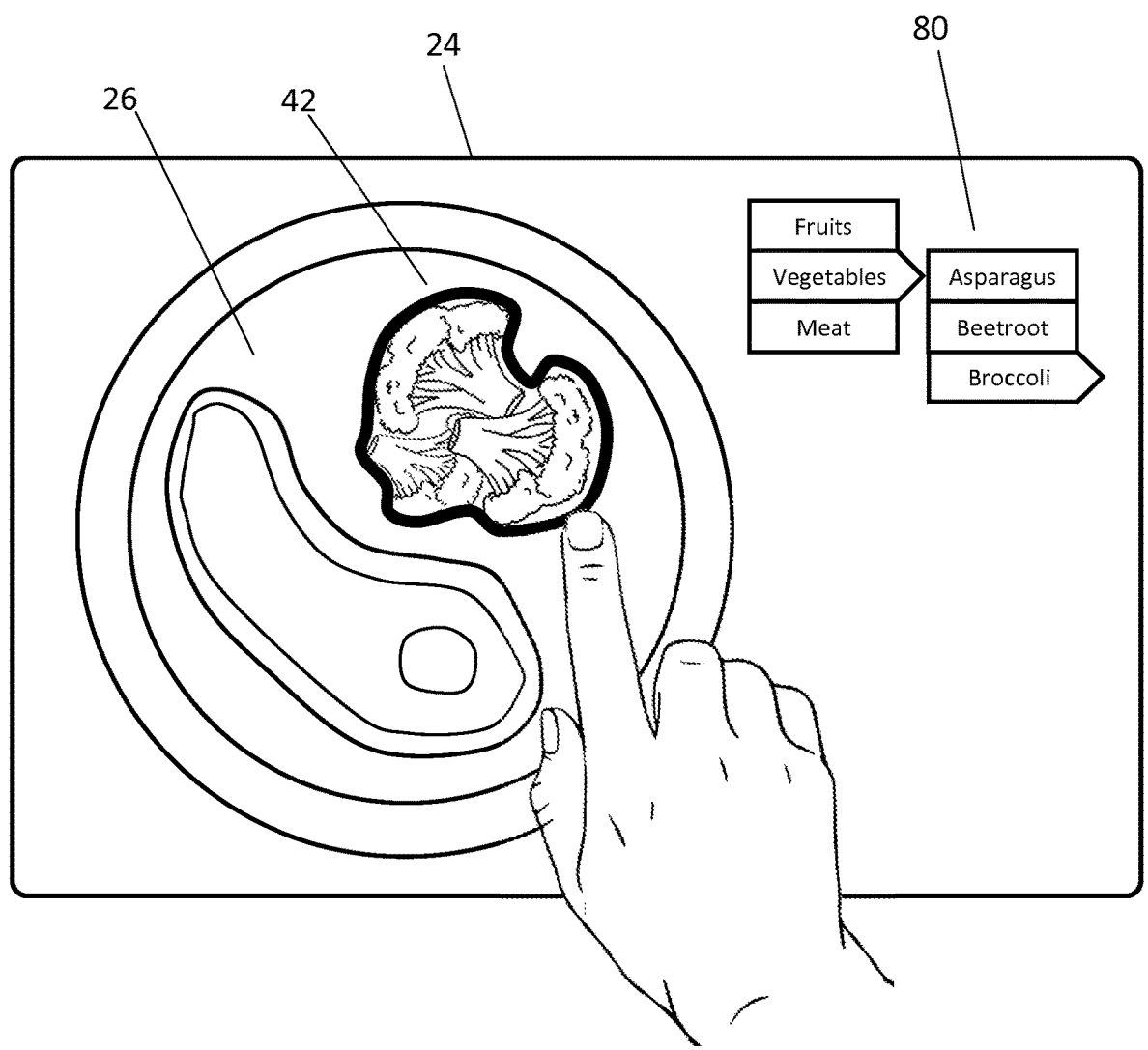
FIG. 7 is a portion of a selective heating oven control panel according to an embodiment of the disclosed systems and methods.

As noted above, the system 12 may also provide calorie estimates for food inside the chamber. FIG. 7 illustrates a portion of a selective heating oven control panel according to an embodiment of the disclosed systems and methods, wherein calorie estimating features are included. As in FIG. 2, the touch screen display 24 may display an image 26 of the contents contained inside the cavity 16 of the system 12 captured by the camera 28. The user may input a selected area 42 corresponding to a physical area inside the cavity. The oven may also have a weight scale to measure to total weight of the food items being placed. Using the area of the user's selection, the total weight of the plate, and an average estimate of food height, the volume of the food may be calculated. The touch screen display 24 may include a food type menu 80 or other input interface allowing the user to enter the type of food that is highlighted. Based on the selected food type (e.g., broccoli in the illustrated example), the estimated food volume, and stored calorie data (available in device 12 memory or via the internet), the oven may return the calorie count. Because lighting conditions, camera angle and settings, motion, and other variables may be stable and/or easily controllable within the cavity 16, the nutritional estimates provided by the oven may be consistent and repeatable.

Figure 8:
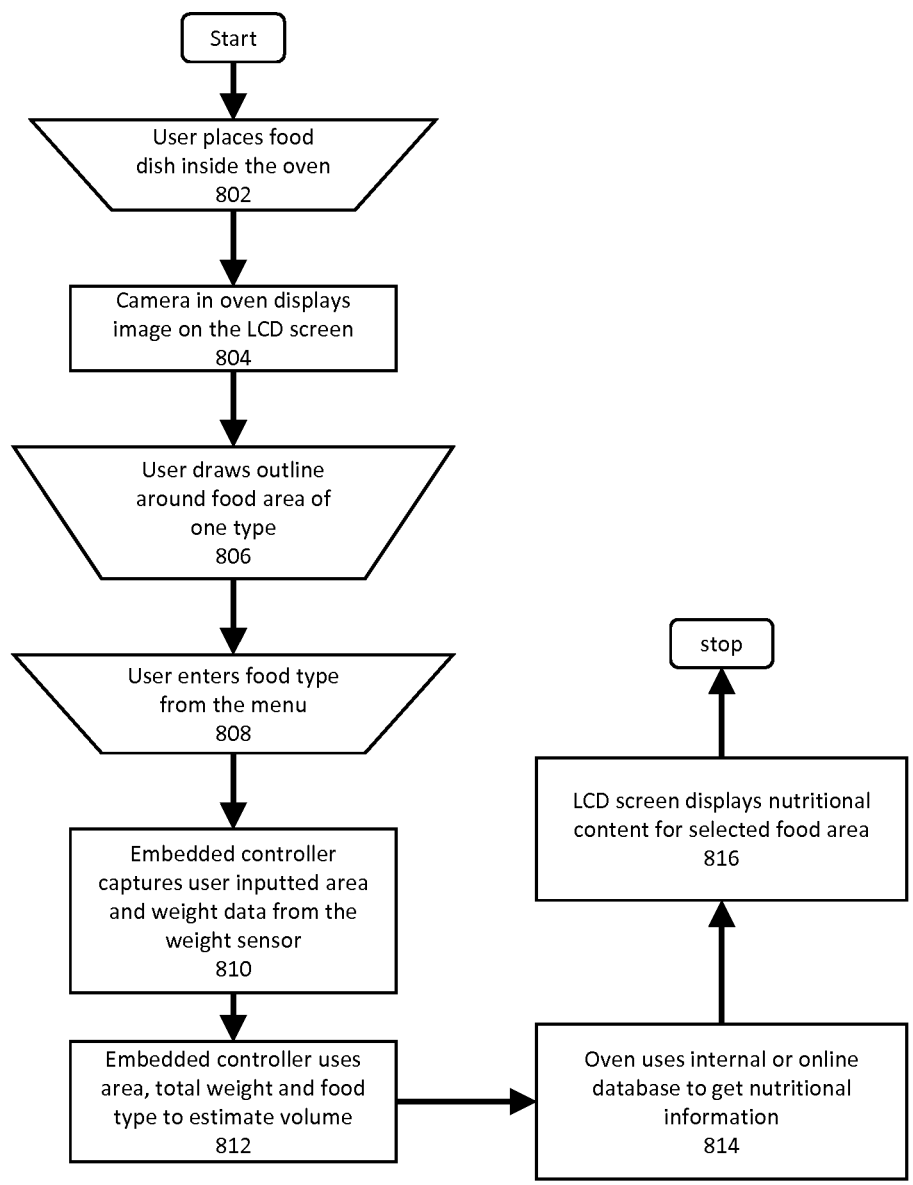
FIG. 8 is a calorie determination process according to an embodiment of the disclosed systems and methods.

FIG. 8 is a calorie determination process according to an embodiment of the disclosed systems and methods. A user may place food inside the oven 802, and the image of the food taken by the camera may be displayed on the display screen 804. The user may select a portion of the food on the plate to be measured, for example by drawing an outline around it as described above 806. The user may specify the type of food that has been selected, for example via menu 80 as described above 808. The system 12 controller may capture the user inputted area and weight data from a weight sensor arranged to weigh the food inside the oven 810. The system 12 controller may use the area, the total weight, and food type to estimate the volume of the food to be measured 812. The system 12 controller may access an internal database and/or a remote database (e.g., via the internet) to find nutritional information for the food type and estimated food volume 814. The system 12 controller may use the touch screen display 24 to display nutritional information for the selected food 816.

Since the oven may be able to selectively heat different areas of a food plate to different temperatures, it may be agreeable to allow manufacturers of dinner foods, microwavable foods, etc. to store information in the form of a machine-readable code (e.g., a QR Code is provided as an example of a machine-readable code in this disclosure) or RFID tag regarding the heat regions and temperatures of the food dish. For example, a vendor may sell a frozen food tray of steak and salad. The vendor may attach a QR sticker to the packaging of the tray. When the tray is inserted into the oven, the camera 28 may detect and read the information off the QR sticker. The information may include a heat map for the dish. In addition, the QR code's orientation may be captured. As such, the oven may now have information on how to heat the dish exactly as the vendor recommends without requiring the user to input any more data. The user may be prompted hit the start button to begin the heating operation. The heating information stored in the sticker may be normalized to power levels and starting temperature of the food items in some embodiments. As such, the correct amount of power may always be delivered to the food items independent of the power level of the receiving oven and/or the initial starting temperature of the food. In other words, a low power oven may heat items longer than a high power oven to achieve the desired heat levels. Moreover, food that is heated starting from a cold temperature (e.g., from a fridge) may be heated using more power than food starting from room temperature.

Storage of data on a QR code, or a machine readable printed sticker, may be limited to several kilobytes of data. To enable storage of the heat map data, the information may be placed in a compressed format, such as a vector format. In the vector format method, each shape may be represented via a set of points. Each point's coordinates may be stored in a data file. When the system processor (e.g., microcontroller 104, described below) receives the data, it may be able to rebuild the shape. For example, assume the following vector text stored on the QR code: "S 0,0 5,0 5,5 0,5 h25" This code represents a square shape starting at coordinates 0-0 and having corners at the other 3 coordinates. The heat level may be denoted by the "h25" (i.e., a heat level of 25). As shown, using 21 characters of space and consuming roughly 21 bytes, one may represent a square shaped heat region and its power level. The data size may be further reduced through data compression. The same methodology can be applied to incorporate complex shapes, donated by points, and thus various heat maps. After the shapes are obtained, the orientation of the QR may be used to rotate the heat map image to match the food. This method is similar to the open standard Scalable Vector Graphics (SVG) specification developed by the World Wide Web Consortium (W3C). However, an SVG format file may have a larger file size than the example file, and SVG does not include orientation data. As such, although the QR code can only fit a small footprint of data, through efficient encoding techniques, the QR code may convey detailed heat map information to the oven. Vendors (e.g., vendors of frozen or reheatable meals) may create and store heat map data onto printable media that can be consumed by the oven's microprocessor through a camera.

In another example, heat map data may be obtained from stored heat map data on an online database. The camera inside the microwave oven may scan the QR code, or other identification codes, on the packaging. The internet connected oven may look up the QR code in an online database including heat maps and download the heat map data. For example, the QR code may be linked to a specific heat map in the database. The oven may use the orientation of the QR code to orient the downloaded heat map as described above. Then, the oven may heat the food per the vendor's specification. This selective heating capability coupled with the heat map sticker may allow manufactures to create a wide array of auto heating food combinations for use with the described ovens.

Figure 10:
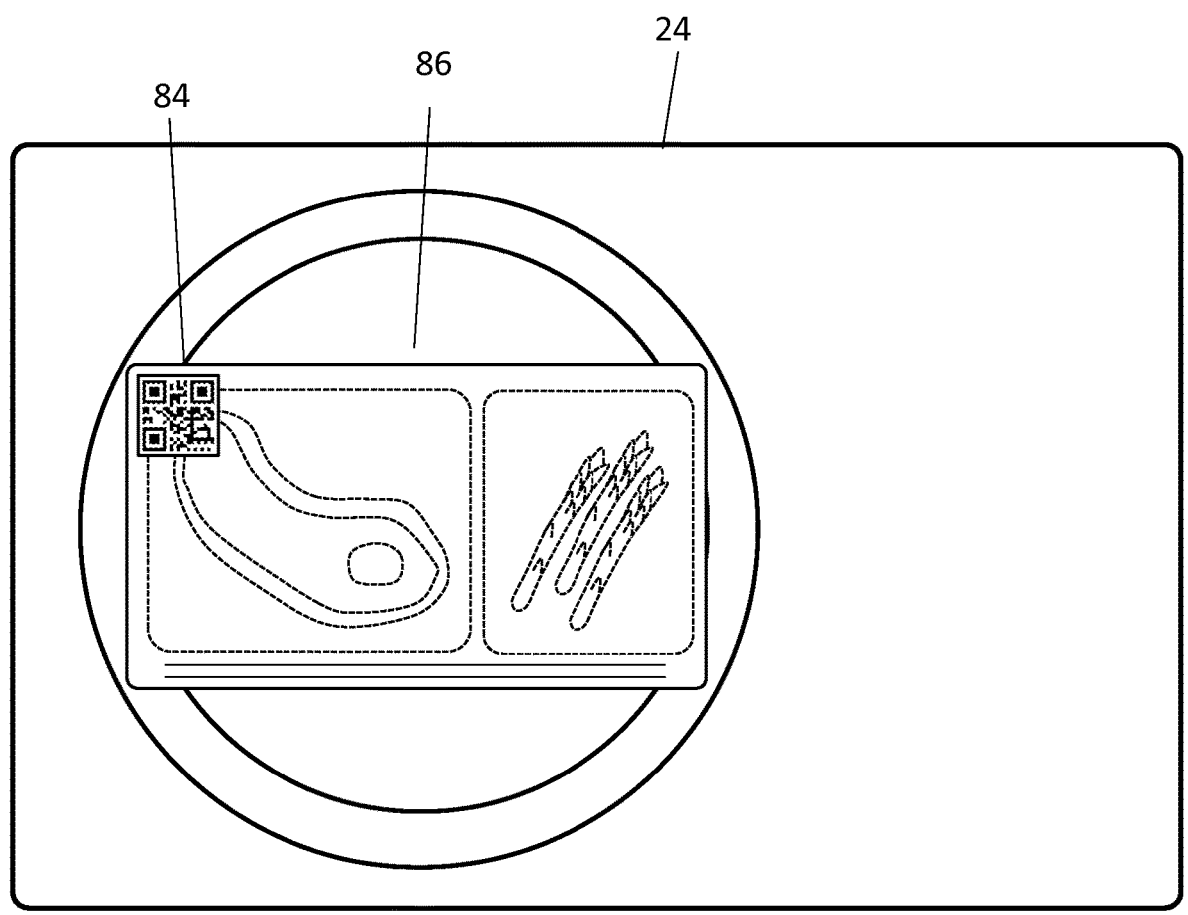
FIG. 10 is a portion of a selective heating oven control panel according to an embodiment of the disclosed systems and methods.

FIG. 10 is a portion of a selective heating oven control panel according to an embodiment of the disclosed systems and methods. As described above, the device 12 may use the camera 28 to read a QR code 84 for heating instructions and determine food orientation based on the orientation of the QR code 84. The touch screen display 24 may display an image of the QR code 84 and/or an image 86 of the orientation of the food inside the cavity 16 of the system 12 captured by the camera 28. In some embodiments, cook time and power data as determined by the QR code may also be displayed. The oven may allow the user to confirm the information and/or to initiate the cooking process.

Figure 5:
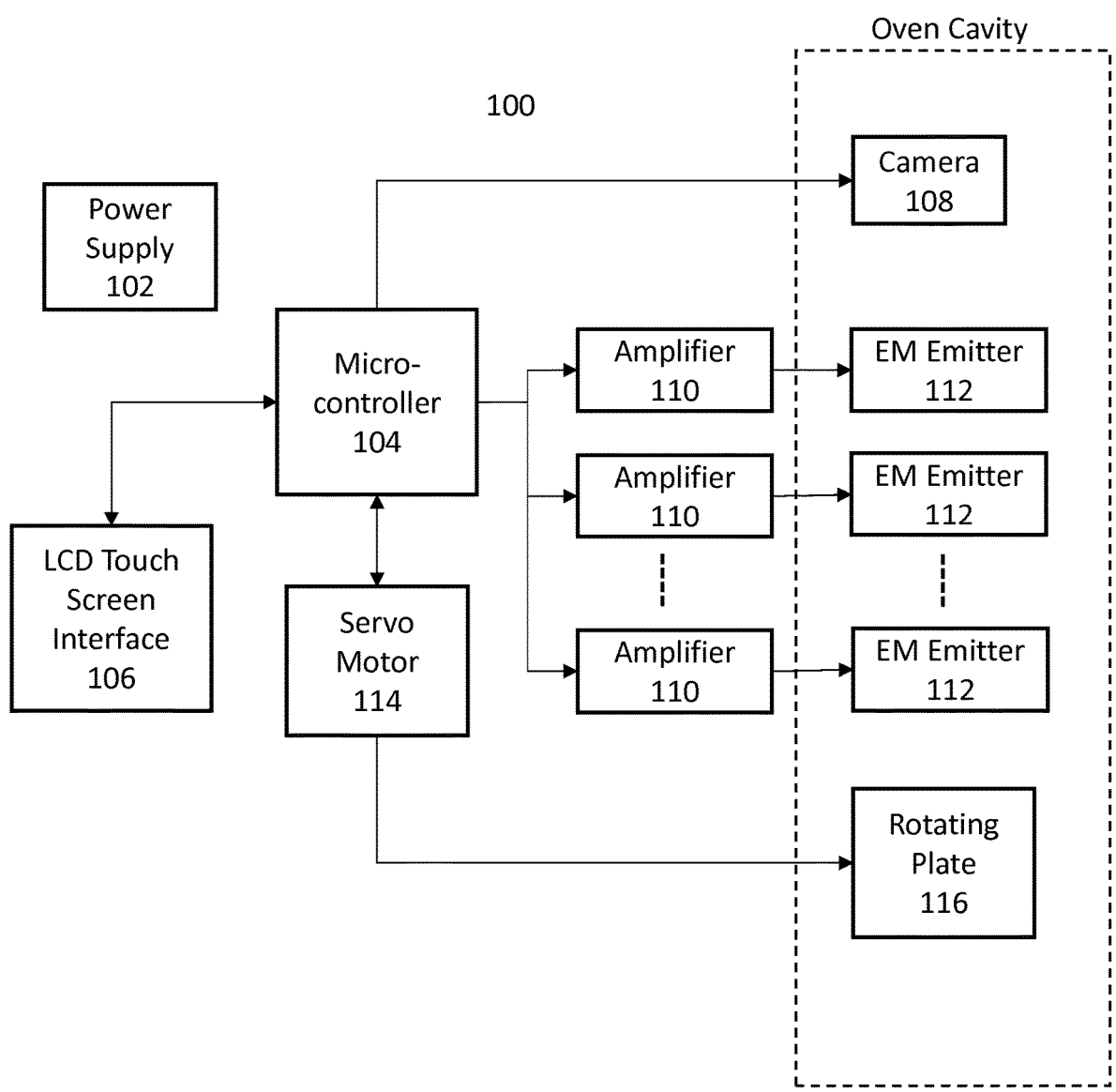
FIG. 5 is a block diagram of an oven control circuit according to an embodiment of the disclosed systems and methods.

FIG. 5 is a block diagram of an oven control circuit 100 according to an embodiment of the disclosed systems and methods. The circuit 100 may control the system to perform the functions described above. The circuit 100 may be powered by power supply 102, which may be configured to supply power from a home AC circuit, a battery, or any other source. The circuit 100 may include a microcontroller 104, which may be any kind of processor capable of interacting with and/or controlling the other circuit 100 components. As discussed above, the microcontroller 104 may receive image data from a camera 108 and display the image on the touch screen interface 106. Via the interface 106, a user may enter heating instructions. The microcontroller 104 may use these instructions to selectively control amplifiers 110 to control amplitude and phase of the signals to the heating elements (EM emitters 112) as described above. The microcontroller 104 may also control servomotor 114 to move the rotating plate 116 on which the food is placed as well as receive food location data based on the position of the servomotor 114, as described above.

Examples of additional embodiments may allow a user to integrate the system 12 with other devices of the user or another user, including communication devices (e.g., smart phones, tablets, computers, etc.), to allow for increased functionality and ease of use, as well as the ability to share the contents or access rights to the system with another user.

For example, using WiFi or Bluetooth protocols, the system may communicate with an application installed on the user's handheld smart phone and may display an image of the food inside the cavity on their smart phone. The camera 28 inside the oven may capture an image of the food that may be read by the microcontroller 104. The microcontroller 104 may be configured to interface with a wireless module, such a Wifi module, which may be added to the circuit of FIG. 5, for example. Through the wireless module, the microcontroller 104 may communicate with an application installed on the user's smartphone. The application may display the image captured by the oven camera on screen. The user may then use his fingers to select the heating regions and heat settings and send this data back to the microcontroller 104 to start the oven heating operation. The data may get transmitted back to the oven so the heating operation may begin. Upon completion of the heating cycle, the microcontroller 104 may transmit a message to the user that may serve as a notification that the food is ready. In addition, the smart phone application may notify the user when important events occur such as the food being left, or forgotten, in the oven for longer than some predetermined length of time. In another example, the microcontroller 104 may transmit calorie related information to a user's smartphone device. After completing the calorie tracking process described previously, the microcontroller 104 may send the resulting calorie calculation and nutritional value of food to the user's smartphone. In addition, the microcontroller 104 may also transmit an image captured of the food. As such, the user may now have a log of all food items and their nutritional information stored in a log on their smartphone device. This may be beneficial for users who keep track of their caloric intake or for users on a health management diet.

Additional example embodiments may include adjustments to the delivery method and intensity of heat that the system may apply to a food item. Additional example embodiments may include adjustments in the inside wall patterns of the anechoic chamber in order for the system 12 to specifically heat other items, including chemicals that require specific heating requirements or to accommodate for alternative heating patterns and wave patterns for heating particular items with specific heating requirements.

Additional example embodiments may include a variety of shapes and forms with respect to the exterior design and dimensions of the system. For example, a system 12 could be configured in an egg-like or circular shape. A system 12 may also be configured to be small enough for a user to have a personal or travel-size microwave-oven, including specific embodiments designed for installation inside of a recreational vehicle or other vehicles where a user may also desire a system 12 for the specific heating of food items.

An additional example embodiment may be adapted for the heating of lunch trays specifically tailored for commercial cafeterias and/or restaurants or other places where food may be served. For example, a system 12 may be configured to accommodate lunch trays that may hold already-prepared trays of food that simply require heating to be ready to serve. A user, possibly a chef or restaurant employee, may use the system to selectively heat a food item that may require heating, while omitting a food item that does not require heating, like a salad or a fresh fruit medley.

In some embodiments trays, packaged food items 14, and other similar devices may be specifically designed for the system 12 and may also allow a user to selectively heat a food item 14 or area within a food item 14.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures that highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A selective heating device comprising:
   a chamber configured to contain a target to be at least partially heated, the target having an overall area;
   a motor configured to rotate the target within the chamber;
   a circuit configured to:
      receive heat map data indicating a portion of the overall area represented by at least two shapes each defined by at least three points in the heat map and a separate energy level for each shape; and
      generate an instruction in response to receiving the heat map data, the instruction causing selective heating of the target defined by the portion of the overall area as indicated in the heat map data, wherein the instruction causes the selective heating by controlling at least one heating element to turn on for a first period of time to selectively heat a first portion of the target represented by a first one of the at least two shapes and controlling the at least one heating element to turn on for a second period of time different from the first period of time to selectively heat a second portion of the target represented by a second one of the at least two shapes; and
   the at least one heating element configured to selectively heat the first portion of the target represented by the first one of the at least two shapes for the first period of time based on the instruction from the circuit; and:
      selectively heat the second portion of the target represented by the second one of the at least two shapes for the second period of time based on the instruction from the circuit; or
      refrain from heating a third portion of the target represented by a third one of the at least two shapes based on the instruction from the circuit; or
      a combination thereof; wherein:
   the at least one heating element comprises a plurality of heating elements configured to heat separate portions of the chamber and configured to be selectively turned on and off; and
   the circuit is configured to control the plurality of heating elements based on the heating instruction by:
      turning on at least one of the heating elements when the first portion of the target, the second portion of the target, or a combination thereof passes into the portion of the chamber which the at least one heating element is configured to heat and turning off the at least one of the heating elements when:
  the first portion of the target, the second portion of the target, or a combination thereof is outside of the portion of the chamber which the at least one heating element is configured to heat,
  the third portion of the target passes into the portion of the chamber which the at least one heating element is configured to heat, or
  a combination thereof.

2. The device of claim 1, further comprising a camera in communication with the circuit, the camera configured to capture an image of the target inside the chamber and send the image to the circuit.

3. The device of claim 2, further comprising a display in communication with the circuit, the display configured to display the image of the target.

4. The device of claim 2, further comprising a user interface including a touch screen in communication with the circuit, the touch screen configured to receive a user selection of a portion of the image indicating the portion of the overall area of the target.

5. The device of claim 1, further comprising a user interface configured to receive a user selection indicating the portion of the overall area of the target, wherein the user selection defines the first portion of the target, the second portion of the target, the third portion of the target, at least one energy level from among the separate energy levels for each shape, the first period of time, the second period of time, or a combination thereof.

6. The device of claim 2, wherein the circuit is further configured to:
  determine nutritional information for the target based on the image of the target, a weight of the target, an estimated volume of the target, an input target type and data about the input target type retrieved from a database, an input target area, or a combination thereof; and
  cause the nutritional information to be displayed.

7. The device of claim 2, wherein the circuit is further configured to:
  read heating instruction data from the image;
  determine a target orientation from the image; and
  generate the portion of the overall area of the target from the heating instruction data and the target orientation.

8. The device of claim 1, wherein the heat map comprises, for each at least one shape, a vector describing each of the points defining the shape and an orientation for the shape.

9. The device of claim 7, wherein the circuit is configured to read the heating instruction data from the image by decoding a machine-readable code in the image.

10. The device of claim 1, wherein the circuit is further configured to:
  receive the portion of the overall area of the target via a network;
  send information about the target to a remote device via the network; or
  a combination thereof.

11. The device of claim 1, further comprising a second motor configured to shift the target along an axis within the chamber, wherein the circuit is configured to:
  control the second motor to shift the target so that the first portion of the target, the second portion of the target, or a combination thereof is shifted into the portion of the chamber which the at least one heating element is configured to heat; and
  turn on the at least one heating element when the first portion of the target, the second portion of the target, or the combination thereof is shifted into the portion of the chamber which the at least one heating element is configured to heat.

12. The device of claim 1, further comprising a second motor configured to shift at least one of the heating elements along an axis within the chamber, wherein the circuit is configured to:
  control the second motor to shift the at least one heating element so that the first portion of the target, the second portion of the target, or a combination thereof is positioned in an area which the at least one heating element is configured to heat; and
  turn on the at least one heating element when the at least one heating element is positioned to heat the first portion of the target, the second portion of the target, or the combination thereof.

13. The device of claim 1, wherein:
  the at least one heating element is configured to send directed energy to a plurality of areas within the chamber; and
  the circuit is configured to control the at least one heating element based on the heating instruction by causing the at least one heating element to send the directed energy to the first portion of the target, the second portion of the target, or a combination thereof.

14. The device of claim 1, wherein the at least one heating element comprises at least one steerable antenna, a phase array antenna, a microwave heating element, an infrared heating element, an electromagnetic heating element, or a combination thereof.

15. The device of claim 1, wherein the chamber comprises a chamber wall configured to absorb radiation that is not being emitted from the at least one heating element to the first portion of the target or the second portion of the target.

16. The device of claim 1, further comprising a reflector configured to reflect stray radiation toward the first portion of the target or the second portion of the target or a combination thereof.

* * * * *